United States Patent [19]

Takewell

[11] 4,087,254

[45] May 2, 1978

[54] PROCESS FOR PELLETIZING WET SILICEOUS PARTICULATES

[75] Inventor: Robert B. Takewell, Borger, Tex.

[73] Assignee: J. M. Huber Corporation, Locust, N.J.

[21] Appl. No.: 556,367

[22] Filed: Mar. 7, 1975

Related U.S. Application Data

[63] Continuation-in-part of Ser. No. 430,457, Jan. 3, 1974, abandoned, which is a continuation of Ser. No. 185,984, Oct. 4, 1971, abandoned.

[51] Int. Cl.² .................. B01J 2/12; C01B 33/12; C01B 33/20
[52] U.S. Cl. .................. 23/313 R; 23/313 AS; 264/117
[58] Field of Search ........ 264/117; 23/313 R, 313 AS

[56] References Cited

U.S. PATENT DOCUMENTS

| | | | |
|---|---|---|---|
| 2,024,176 | 12/1935 | Lloyd | 264/37 |
| 2,686,161 | 8/1954 | Stewart | 23/313 AS |
| 3,387,931 | 6/1968 | Burke | 23/313 AS |
| 3,401,017 | 9/1968 | Burke | 23/313 AS |
| 3,623,858 | 11/1971 | Smith | 23/313 AS |

FOREIGN PATENT DOCUMENTS

695,303  8/1953  United Kingdom ................. 264/117

OTHER PUBLICATIONS

Browning, Chemical Engineering, "Agglomeration," Dec. 4, 1967, McGraw-Hill, New York, pp. 147-149, 165, 166.

Primary Examiner—Stephen J. Emery
Attorney, Agent, or Firm—Harold H. Flanders

[57] ABSTRACT

An improved process for pelletizing siliceous materials produced in an aqueous medium is disclosed. The process comprises the improvement of filtering the aqueous medium in which the siliceous materials are produced or refined, forming a slurry of the filter cake obtained by filtration and thereafter introducing the slurry directly into a pelletizer. The pellets thus formed are dried and a portion thereof recycled to the pelletizer so that the solids content of the slurry has a predetermined solids content. The process obviates the need for an initial drying of the filter cake, reduces the drying of excess water at several steps and provides for the recycling and use of unsatisfactory materials.

1 Claim, 1 Drawing Figure

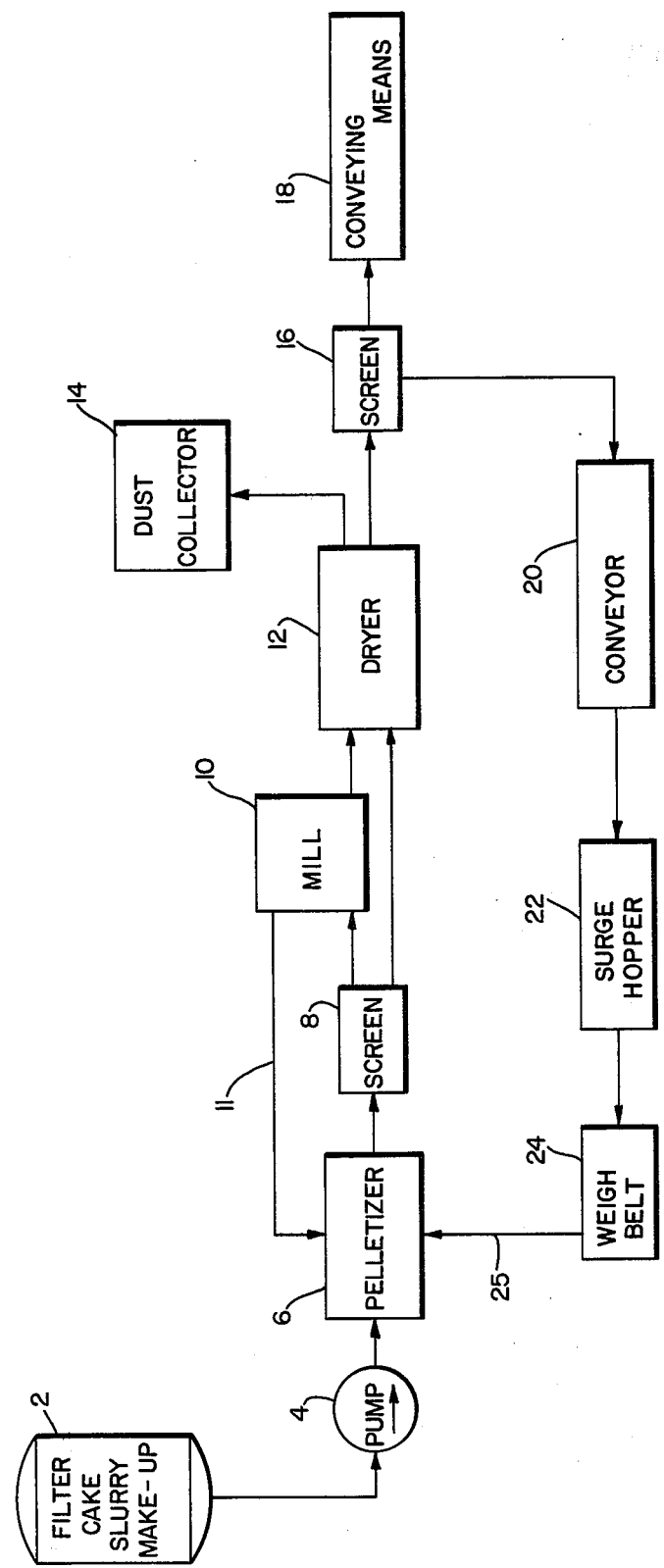

PROCESS FOR PELLETIZING WET SILICEOUS PARTICULATES

RELATIONSHIP TO CO-PENDING APPLICATIONS

The present application is a continuation-in-part of U.S. Ser. No. 430,457 filed Jan. 3, 1974, which was a continuation of U.S. Ser. No. 185,984 filed Oct. 4, 1971, now abandoned.

BACKGROUND OF THE INVENTION

The present invention relates to the agglomeration of particulate materials and, more particularly, to a process for pelletizing filter cake slurries of siliceous materials.

Pelletization is well known in the prior art. While various pelletizers are now capable of providing acceptable pellets of particulate materials, the industries in which these pelletizers might be most advantageously applied have experienced difficulty in integrating known pelletization techniques into their processes in an economically satisfactory manner. In part, the difficulty in making this integration derives from the necessity to substantially repeat various necessary process steps, such as drying, to produce a satisfactory product. This has often increased product costs above an acceptable level. This significant problem of the prior art is substantially reduced by the present invention.

SUMMARY OF THE INVENTION

The present invention relates to an improved process for pelletizing siliceous materials produced in an aqueous medium. Specific examples of such products include clays, silicas, and silicates. The process comprises the improvement of filtering the aqueous medium in which the siliceous materials are produced or refined, forming a slurry of the filter cake obtained by filtration and thereafter introducing the slurry directly into a pelletizer. The pellets thus formed are dried and a portion thereof recycled to the pelletizer so that the solids content of the slurry has a predetermined solids content. The process obviates the need for an initial drying of the filter cake, reduces the drying of excess water at several steps (required in known processes), and provides for the recycling and use of unsatisfactory materials.

It is accordingly a general object of the present invention to provide a new and highly effective system for pelletizing filter cake slurries, said process overcoming the deficiencies of the prior art techniques.

The present invention overcomes the deficiencies of the prior art and achieves its objectives by providing for the pelletization of filter cake slurry in conjunction with recycled, dried materials.

BRIEF DESCRIPTION OF THE DRAWING

Further objects and a fuller understanding of the present invention may be had by referring to the following detailed description and accompanying drawing which forms a part of this specification and wherein:

FIG. 1 is a schematic flow drawing illustrating a particular advantageous arrangement of apparatus for carrying out the process of the present invention. The drawing should not be construed as limiting but rather as exemplary.

DESCRIPTION OF THE PREFERRED EMBODIMENT (S)

As discussed above and broadly speaking for the moment, the present invention relates to an improved process for agglomerating finely divided particulates comprising the steps of (a) producing finely divided particulates of clay, silica, or silicates in an aqueous media (b) filtering the aqueous medium to form a filter cake of said particulates (c) preparing a slurry of the said filter cake (d) introducing said filter cake slurry and dried or recycled particulates thereof into a pelletizer (e) pelletizing said slurry (f) drying the pellets thus produced (g) recycling at least a portion of the dried pellets to said pelletizer (see step d) and (h) recovering the remainder of the dried pellets. It is, of course, the slurry of the filter cake that is introduced into the pelletizer. Thus, the present invention relates to a process for pelletizing siliceous materials that are produced in an aqueous medium. The slurry (having a solids content of from about 20 to 65%) is introduced into the pelletizer with the aforesaid recycled particulates being added thereto to adjust the solids content of the slurry to form about 50 to 90% by weight.

Turning now to further and more specific details of the present invention and with reference to FIG. 1, a filter cake slurry from a filter cake slurry make-up tank 2 is introduced by way of a suitable pump 4 into a pelletizer 6. The filter cake slurry may be continuously formed in the tank or vessel 2 as the filter cake is removed from the filter. A dispersant may be added to this slurry if required. Typically, a filter cake slurry of clay may be produced having a solids content of 50 to 65% solids by weight. Solids content of smaller particle size materials may be considerably less, e.g., as low as 20%.

Any suitable pump 4, or equivalent means, including gravity, may be used to transfer the filter cake slurry to the pelletizer 6. As well known in the art, the pelletizer 6 may typically be a pinmixer or rotating drum pelletizer. However, any other suitable means of pelletization may be employed.

While the present invention is described in terms of clay processing, the system of the present invention may be employed to equal advantage in other process streams involving related steps, as for example, the processing of various silicas, silicates, and sodium alumino silicates, in particular.

In this regard, and again as briefly discussed above, it should first be noted that the present invention relates to a process for pelletizing siliceous products that are produced in an aqueous medium. Thus and as is well known in the art, crude clay, such as kaolin clay, may be refined or classified by suspending the clay in an aqueous medium, i.e., water, and thereafter effecting classification and/or fractionation in large settling tanks, by mechanical means or the like. Specific examples of such known processes are disclosed in U.S. Pat. Nos. 3,661,515 and 3,743,190. In any event, the clay fraction is recovered by filtration and the filter cake is then dried. In prior practice the dried clay is then pelletized by passing the dried material through a rotary drum, etc., wherein the solids are contacted with water and/or binders. The pellets from the pelletizer are thereafter dried. The latter constitutes a second and separate drying step. This procedure is costly, complex, and raises the overall cost of the product.

In addition to the processing of clays, it is conventionally commercial practice to produce silicas and silicates in an aqueous reaction medium. For example, alkali alumino silicates may be produced by introducing a metal silicate, such as sodium silicate, and an aluminum salt, such as aluminum sulfate, into an aqueous reaction media (water) and thereafter precipitating finely divided particulates of the silicates. A specific teaching of such a process is disclosed in U.S. Pat. No. 2,739,073. Also see, e.g., U.S. Pat. Nos. 3,582,379 and 3,228,125. Notwithstanding the particular material being made, in such prior techniques it has been the practice in the industry to recover the finely divided solids, e.g., the silicate, by filtration and to thereafter dry the filter cake.

In accordance with the present invention, the first or initial drying step is eliminated by forming a slurry of the filter cake and introducing the slurry into a pelletizer. In contrast to conventional processes involving the drying of the filter cake and the addition of water during the pelletization step, the process of the instant invention has the distinct and significant advantages of using the water of the filter cake in pelletization, reducing the amount of water required to be added to the pelletizer, eliminating the aforesaid initial drying step, reducing the drying of excess water at several steps and providing for the recycling and use of unsatisfactory material.

Following pelletization, it may be desirable to screen the pellets by way of suitable screening apparatus indicated generally at 8 to remove any undesired, oversized pellets, for example, those having a diameter in excess of one or one and a half inches.

The oversized pellets may be passed into a mill or crusher 10 to reduce their size and then passed to the dryer 12. In the alternative, the crushed oversized pellets may be recycled to the pelletizer by way of conveying and conduit means 11, if desired, so long as adequate control is provided to insure the desired solids concentration in the pelletizer.

The moisture content of the clay pellets following a typical wet pelletization process will be in the range of 10-18%. The moisture content of smaller particle size materials may be considerably higher. Therefore, as indicated above, it is desirable to pass the pellets into a dryer 12 which is preferably a direct fired rotary dryer. However, any suitable means of drying, direct or indirect, may be employed.

In some processes, which is a unique aspect of the invention, it is possible to eliminate the dryer entirely if the higher moisture content of the pellets, which would result, would be acceptable. Typically, the dryer is intended to reduce the precentage of moisture in the pellets to a value on the order of 3 to 5%.

A dust collector 14, of the fan-type or other suitable design, may be employed to remove the extreme fines and dust from the dryer.

The remaining pellets may then be screened at 16. The acceptable pellets at this point may be passed by elevator 18 or similar conveying means to finished product storage.

A conveyor 20 or similar means may be employed to feed unacceptable fines and/or small pellets to a surge hopper 22 and then to weight belt 24. Suitable conveyor and/or conduit means 25 are provided for recycle to the pelletizer 6 as shown in FIG. 1.

In addition to merely recycling the fine fraction of the finished product, it is desirable to recycle sufficient dried material to the pelletizer 6 to bring the solids content of the filter cake slurry being pelletized up to 50 to 90% during pelletization.

As will be appreciated by those skilled in the art, in addition to, or in lieu of, the recycling of dried material, additional amounts of dried clay may be added directly to the filter cake slurry either at 2 or at the pelletizer 6. The amount of dried material, whether recycled or not, to be added to the filter cake slurry may be determined by the conventional use of weight belts and the like.

Other alternatives which will suggest themselves to those familiar with the art are the addition of clays in dry or slurry form at the surge hopper 22 for addition to the filter cake slurry at the pelletizer 6.

In operation, and by way of example, a 59% solids slurry of clay may be produced at 2 and pumped into the pelletizer 6 (with sufficient dried materials to bring the solids content of the slurry in the pelletizer to 60 to 80%). The pellets are then screened (8) and either crushed (10) or passed directly to a dryer 12 wherein undesirable fines and dust are removed by a dust collector 14. Following drying, the pellets are screened and the acceptable pellets, or some predetermined portion of them, are passed to the elevator-conveyor 18 for transfer to finished product storage. The remaining portion are recycled by a conveyor 20 to a surge hopper 22 for weighing and conveying prior to their being introduced or more properly, reintroduced, to the pelletizer 6.

In general, it has been found desirable to recycle (or add) approximately 300–450 parts of material on a dry basis for each 100 parts of clay on a dry basis added to pelletizer 6 in the form of filter cake slurry. However, such proportions may be altered to produce the results desired in specific circumstances or for material other than clay.

In summary, it may be seen that as opposed to the conventional process of drying the filter cake, then adding water during the pelletization process followed by later drying of the pellets to an acceptable level, the process of the present invention has significant advantages including using the water required to be added to pelletizer, eliminating at least one drying step or reducing the drying of excess water at several steps, and providing for the recycling and use of unsatisfactory material.

Although a specific preferred embodiment of the present invention has been described in the detailed description above, the description is not intended to limit the invention to the particular forms or embodiments disclosed herein, since the present disclosure is intended to be illustrative rather than restrictive or exclusionary. The invention is thus intended to cover all changes and/or modifications of the present invention which do not constitute departures from the spirit and scope of the invention.

What is claimed is:

1. In a process for agglomerating finely divided siliceous particulates selected from the group consisting of clay, silica, and silicates wherein said finely divided particulates of said clay, silica, and silicates are produced in an aqueous medium and are filtered and introduced into a pelletizer to form agglomerates thereof, the improvement comprising:
   (a) producing finely divided particulates of clay, silica, and silicates in an aqueous medium;
   (b) filtering said aqueous medium to form a filter cake of said siliceous particulates;

(c) preparing a slurry of said filter cake of said siliceous particulates, said slurry having a solids content in the range of from about 20 to 59% by weight solids;

(d) introducing said filter cake slurry of said siliceous particulates and recycled dried siliceous pelletized particulates thereof into a pelletizer in an amount so that the slurry of siliceous particulate material to be pelletized has a solids content by weight percentage in the range of from about 60 to 80%;

(e) pelletizing said slurry of said siliceous particulates;

(f) drying said formed pellets to a moisture content of about 3 to 5%;

(g) recycling at least a portion of the dried siliceous pellets produced by pelletizing said slurry to said pelletizer to form a portion of the particulate siliceous materials to be added to said filter cake slurry in said pelletizer; and (h) recovering the remainder of the siliceous pellets.